US012123230B2

(12) United States Patent
Lebsak et al.

(10) Patent No.: US 12,123,230 B2
(45) Date of Patent: Oct. 22, 2024

(54) LOCKING DEVICE FOR A VEHICLE DOOR, AND METHOD

(71) Applicant: Magna BÖCO GmbH, Wuppertal (DE)

(72) Inventors: Vladimir Lebsak, Wuppertal (DE); Henrik Johann, Wermelskirchen (DE); Jörg Thomas Klein, Leverkusen (DE)

(73) Assignee: Magna Closures Inc., Newmarket (CA)

( * ) Notice: Subject to any disclaimer, the term of this patent is extended or adjusted under 35 U.S.C. 154(b) by 494 days.

(21) Appl. No.: 17/233,723

(22) Filed: Apr. 19, 2021

(65) Prior Publication Data

US 2021/0238898 A1 Aug. 5, 2021

Related U.S. Application Data

(63) Continuation of application No. 15/700,594, filed on Sep. 11, 2017, now Pat. No. 11,015,375.

(51) Int. Cl.

| | |
|---|---|
| ***E05B 83/24*** | (2014.01) |
| ***E05B 81/04*** | (2014.01) |
| ***E05B 85/24*** | (2014.01) |
| ***E05B 85/26*** | (2014.01) |

(52) U.S. Cl.

CPC .............. *E05B 83/24* (2013.01); *E05B 81/04* (2013.01); *E05B 85/24* (2013.01); *E05B 85/243* (2013.01); *E05B 85/26* (2013.01)

(58) Field of Classification Search

CPC .......... E05B 81/14; E05B 85/26; E05B 81/06; E05B 81/00; Y10S 292/23

See application file for complete search history.

(56) References Cited

U.S. PATENT DOCUMENTS

| | | | | |
|---|---|---|---|---|
| 3,905,627 A | 9/1975 | Fujita | | |
| 6,817,636 B1 * | 11/2004 | Evans | E05B 81/14 | 292/216 |
| 7,111,877 B2 * | 9/2006 | Larsen | E05B 81/14 | 292/201 |
| 9,784,021 B2 * | 10/2017 | Torka | E05B 81/68 | |
| 9,810,004 B2 * | 11/2017 | Scholz | E05B 81/20 | |
| 2010/0052336 A1 * | 3/2010 | Bendel | E05B 85/26 | 292/196 |
| 2011/0204660 A1 * | 8/2011 | Cumbo | E05B 85/243 | 292/217 |
| 2011/0210565 A1 * | 9/2011 | Scholz | E05B 85/26 | 292/200 |
| 2012/0091738 A1 | 4/2012 | Coleman et al. | | |
| 2012/0181798 A1 * | 7/2012 | Margheritti | E05B 81/16 | 292/200 |
| 2012/0313384 A1 * | 12/2012 | Cumbo | E05B 81/14 | 292/199 |

(Continued)

*Primary Examiner* — Mark A Williams

(74) *Attorney, Agent, or Firm* — Dickinson Wright PLLC

(57) ABSTRACT

A locking device for a vehicle door, in particular for a motor-vehicle bonnet, comprising a first inhibiting pawl prestressed into an inhibiting position, wherein a rotary latch can be arrested in a locking position by the first inhibiting pawl located in its inhibiting position, and a second inhibiting pawl prestressed into an inhibiting position, wherein the rotary latch can be arrested in a safety-catch position by the second inhibiting pawl located in its inhibiting position. The first and second inhibiting pawls can be transferred from their respective inhibiting position into a release position by a common actuating means.

8 Claims, 11 Drawing Sheets

(56) References Cited

U.S. PATENT DOCUMENTS

| | | | | |
|---|---|---|---|---|
| 2013/0270841 | A1* | 10/2013 | Coleman | E05B 77/36 292/100 |
| 2013/0300133 | A1 | 11/2013 | Margheritti | |
| 2014/0091581 | A1 | 4/2014 | Taurasi et al. | |
| 2014/0203572 | A1* | 7/2014 | Barmscheidt | E05B 81/34 292/200 |
| 2015/0368934 | A1 | 12/2015 | Tomaszewski | |
| 2018/0058116 | A1* | 3/2018 | Erices | E05B 83/18 |
| 2018/0163439 | A1* | 6/2018 | Patane | E05B 81/16 |

* cited by examiner

LOCKING DEVICE FOR A VEHICLE DOOR, AND METHOD

CROSS-REFERENCE TO RELATED APPLICATIONS

This application is a continuation of U.S. patent application Ser. No. 15/700,594 filed on Sep. 11, 2017, which claims the benefit and priority of German Application No. 102016011162.3, filed Sep. 16, 2016. The entire disclosure of the above application is incorporated herein by reference.

FIELD

The present disclosure relates generally to locking devices for a hinged panel of a motor vehicle and more particularly to a locking device for a bonnet or hood.

BACKGROUND

This section provides background information related to locking devices for motor vehicles which is not necessarily prior art.

In contrast to conventional side doors, or even rear doors/hatches, the bonnet (i.e. hood) region requires different safety precautions as a result of the fact that, during travel, the bonnet should not swing up accidentally, in which case it could block the driver's view. Therefore, in addition to the rotary latch, conventional bonnet locking devices also have a so-called safety catch. If the rotary latch is moved from its latched position into its open position, and if the locking element is released, the bonnet still has the safety catch engaging behind it, typically at a different location, and then, for example manually, can be disengaged from the safety catch and opened.

It has also been known to combine the safety catch and the rotary latch into one element. For this purpose, one of the mouth flanks of the rotary latch is typically in the form of a safety catch. Such a rotary latch, however, then requires no longer to provide just a locking position, but typically also provide a safety-catch position, which, in terms of the opening sequence, follows the locking position. For example, it is possible for the inhibiting pawl to be actuated twice, and prior to this for the rotary latch to perform an inhibiting or arresting action twice during an opening operation, that is to say first of all in the locking position and, prior to a second inhibiting pawl actuation, then in the safety-catch position.

However, attempts have also been made to secure the locking position and the safety-catch position of the rotary latch using different inhibiting pawls. It is then typically the case that a first inhibiting pawl is assigned to a front side of the rotary latch (for arresting purposes in a locking position) and a rear side of the rotary latch has arranged on it a second inhibiting pawl for arresting the rotary latch in a safety-catch position. In the prior art, these two inhibiting pawls are usually assigned to separate actuating means, typically in the form of manually actuable Bowden cables. A vehicle driver can actuate the first inhibiting pawl manually from the vehicle interior and can then actuate the second inhibiting pawl manually from the outside of the vehicle.

It is precisely in the context of the vehicle as a whole becoming increasingly electrified that this method of opening a locking device is being regarded more and more as an inconvenience.

SUMMARY

This section provides a general summary of the disclosure and is not intended to be considered a comprehensive listing of its full scope or all of its objectives, aspects and features.

It is therefore the object of the invention to provide a bonnet locking device which is more user-friendly.

According to a first aspect of the invention, this object is achieved by the features of claim 1. According to the first aspect, the invention is therefore characterized in that first and second inhibiting pawls can be moved from their respective inhibiting position into a release position by the use of the same (i.e. common) actuating means. In other words, the concept of the invention is to make it possible for the two inhibiting pawls to be displaced with the aid of a single drive mechanism. The single drive mechanism may be an electric motor which can act on the actuating means of the locking device via a Bowden cable or the like, or also directly.

The actuating means may be, for example, a point of attachment for a Bowden cable (or some other operating cable) or a linkage which, as a result of being activated, or actuated, causes at least one of the inhibiting pawls to be transferred into its release position. The actuating means may be formed here, for example, by an arm or one end of a drive lever, or even by the drive lever itself, or it may comprise such a drive lever and/or also the Bowden cable.

The critical factor here is that the actuating means can be activated either just manually (for example with the aid of a handle or of a manually actuable Bowden cable or the like) or automatically, that is to say with the aid of a drive mechanism, which may be designed, for example, in the form of an electric motor. In the last-mentioned example, the electric motor can cause the actuating means to be activated.

Each actuating means here can cause one of the inhibiting pawls to be displaced. The activation of the electric motor is typically initiated manually (for example by a vehicle driver pressing a button) or after a certain period of time has elapsed, for example a certain period of time after an engine has been switched off or a test system or the like has been activated.

According to the invention, the actuating means here is triggered or activated both in order to displace the first inhibiting pawl and to displace the second inhibiting pawl. These two activations of the actuating means take place preferably at different points in time.

When the actuating means is activated for a first time, it can act for example directly or indirectly on the first inhibiting pawl and when the actuating means is activated for a second time, at a different point in time, it can then act directly or indirectly on the second inhibiting pawl, in each case in order to move the inhibiting pawl into the respective release position. In this release position, the rotary latch is typically released by the inhibiting pawl and can pivot in the opening direction, preferably under spring prestressing or manually.

To summarize, the actuating means can act at any rate indirectly both on the first inhibiting pawl and on the second inhibiting pawl. The actuating means can preferably be coupled to the first inhibiting pawl and/or to the second inhibiting pawl for this purpose.

The inhibiting pawls each have an inhibiting position in which they arrest or inhibit the rotary latch in its locking position (first inhibiting pawl) and in its safety-catch position (second inhibiting pawl). The two can each be transferred into a (different) release position. This movement into the release position takes place by virtue of the actuating means being activated, for example with the aid of the (one) electric motor. For this purpose, the actuating means can act on the respective inhibiting pawl preferably indirectly, that is to say via a gear mechanism or lever system or the like.

An arresting action by one of the inhibiting pawls is therefore understood to mean, in the context of the present application, a blocking action, that is to say blocking in the movement direction of the rotary latch in the opening direction. There is no need here for the inhibiting pawl to arrest the rotary latch for which reason the main claim, in particular in respect of the second inhibiting pawl, has also used the word "inhibit" merely to afford more clarity here. The first inhibiting pawl will typically always establish contact with, and arrest, the rotary latch. In a preferred exemplary embodiment, the second inhibiting pawl can arrest, that is to say inhibit, the rotary latch in its safety-catch position in a contactless manner, in particular in respect of the opening direction thereof.

When the actuating means is activated for a first time, it can typically be coupled to the first inhibiting pawl in order to displace the same. It is then typically uncoupled from the first inhibiting pawl. This is then followed by coupling to the second inhibiting pawl (for example prior to the actuating means being activated for a second time). It is then possible for a second activation of the actuating means to transfer the second inhibiting pawl into its release position, in which case the rotary latch is then typically in a fully released state.

In the fully released position, a locking element (which is typically assigned to the vehicle door or bonnet) can then pass all the way out of the mouth region of the rotary latch, in particular out of the safety-catch region. This is not typically possible in a safety-catch position of the rotary latch, certainly not in a locking position of the rotary latch.

In their respective inhibiting position, the first and the second inhibiting pawls can typically cooperate with other, in particular opposite, surfaces of the rotary latch, in order to arrest the rotary latch in the respective position. It is thus possible for the first inhibiting pawl to cooperate typically with a locking-action inhibiting surface of the rotary latch (in a preferred exemplary embodiment, in addition, also with a preliminary-latching surface) and for the second inhibiting pawl to cooperate typically with a safety-catch-action inhibiting surface of the rotary latch.

As already indicated above, the rotary latch typically has a safety-catch-like portion on a flank assigned to the mouth region. For this purpose, said safety-catch portion can for example (when viewed from the outside) partially cover over the mouth of the rotary latch.

The rotary latch is typically prestressed into its open position, for example by a spring or the like assigned to its pivot pin. The prestressing direction leads from the locking position into the safety-catch position and then onwards into a fully open position.

In order that the locking element can be guided out of the safety-catch-like mouth of the rotary latch in the fully open position of the latter, the locking element is typically assigned a separate lifting lever, which can be fitted in particular coaxially in relation to one of the inhibiting pawls, in particular the first inhibiting pawl, and is likewise prestressed in the opening direction. A lifting function is also possible via a lifting spring outside the lock.

The locking element itself is typically arranged on the vehicle door, that is to say for example a hinged opening panel, in particular on a bonnet, whereas the locking device is typically arranged on the vehicle body, for example on a separate housing or on an installation plate or the like. It is also conceivable in principle, however, for this arrangement to be the other way round.

The locking element is typically a central leg of a U-shaped striker or a striker pin or a similarly suitable element.

Finally, it should be noted that the vehicle door, as already mentioned, is typically a motor-vehicle bonnet, in which a safety-catch-like formation of the rotary latch is particularly expedient, and so the two separate inhibiting pawls typically become necessary in the first place. However, the door may also, in principle, be any other kind of vehicle door, for example a rear door/hatch or the like. The vehicle doors here are associated preferably with motor vehicles, in particular passenger vehicles.

According to the invention, provision is typically made for the two inhibiting pawls, that is to say the first inhibiting pawl and the second inhibiting pawl, to be arranged at a distance from one another. For example, it is possible for one inhibiting pawl to be assigned to the front side of a rotary latch and for the other inhibiting pawl to be assigned to the rear side of the rotary latch. At any rate, the inhibiting pawls are arranged here such that they do not interengage, and in particular are not coupled in terms of movement either. The two inhibiting pawls are preferably arranged non-coaxially in relation to one another, that is to say they are not fitted on the same pivot pin.

According to a particularly advantageous embodiment of the invention, the actuating means can be triggered or activated in a motor-controlled manner. It would basically also be possible for the device to provide for a manual activation of the actuating means, for example with the aid of a handle or the like. However, since the invention can be used particularly advantageously for vehicles which have highly developed electronics (so-called electric vehicles), the actuating means is therefore activated, or actuated, preferably in a motor-controlled manner, in particular with the aid of an electric motor. For this purpose, the motor can act, for example, on an operating cable (or a Bowden cable) which has one end secured to the actuating means or which helps to form the actuating means.

As an alternative, it is also, of course, correspondingly possible for the motor to act on a linkage, or on a push rod or the like. The critical factor here is that the motor, preferably the electric motor, ensures displacement both of the first inhibiting pawl and of the second inhibiting pawl, this being done, of course, indirectly, with the aid of the actuating means and of the possibly associated further lever elements, such as a drive lever or the like.

A first actuation of the motor here can cause a first activation of the actuating means of the device and a displacement of the first inhibiting pawl. A second actuation of the motor can cause a second activation of the actuating means and a displacement of the second inhibiting pawl. It is possible here for example for a drive lever to be automatically coupled to, and uncoupled from, the first or the second inhibiting pawl.

Provision is preferably made for the actuating means to be capable of being activated only by the motor; no manual activation being provided for. In the context of redundancy, however, without any operation of the actuating means (that is to say separate operation in each case), it would theoretically be possible for the individual inhibiting pawls possibly to be actuated manually, separately in each case, for example in an accident situation or in the event of the vehicle electronics failing, via a handle.

According to the most preferred embodiment of the invention, the actuating means is assigned a drive lever. This drive lever can act directly or indirectly both on the first inhibiting pawl and also on the second inhibiting pawl. The actuating means here typically comprises one end of the drive lever or an arm of the drive lever or the like. Further levers may be arranged on the drive lever in order to act on the two inhibiting pawls in the manner of a linkage or drive. The drive lever is preferably fitted coaxially with the rotary latch. This makes it possible to simplify the geometry of the locking device and to reduce the number of components required. The drive lever, moreover, can be displaced in a motor-controlled manner, or by an electric motor, for example with the aid of a Bowden cable or the like.

In order for said drive lever to be able to act on the first inhibiting pawl to displace the latter into its release position, the drive lever may have an actuating arm, which can act in particular directly on the inhibiting pawl. It is possible for the actuating arm to comprise, for example, a contact bolt or the like, which can be brought into contact with a contact surface of the inhibiting pawl. Establishing contact in this way may also be referred to as coupling. Of course, it is not imperative to have a contact bolt, use may also be made of some other suitable element, for example also a flat surface or the like arranged on the actuating arm. In addition to the actuating arm, the drive lever can typically also have at least one operating arm, on which the actuating means is provided.

As an alternative, it is also possible, however, for an actuating lever to be arranged, in particular in a pivotable manner, on the drive lever in order to establish contact with, and displace, the first inhibiting pawl. In this case, it is possible for the actuating lever to be mounted on the drive lever via a pivot pin arranged on the drive lever and to be displaced along with the drive lever in this way. In this case, it is therefore articulated on the drive lever.

According to a particularly advantageous embodiment of the invention, a coupling lever for actuating the second inhibiting pawl is arranged on the drive lever. In particular, this coupling lever may be arranged coaxially in relation to the aforementioned actuating lever (if the lever is provided in the first place). The coupling lever here is typically articulated or arranged in a pivotable manner on the drive lever. It may have a coupling state, in which it is coupled to the second inhibiting pawl. In this state, it can, for example, engage behind said inhibiting pawl. In another, uncoupled state, the coupling lever may be arranged in particular at a distance from the second inhibiting pawl. With the aid of the coupling lever, when the actuating means is activated, the second inhibiting pawl can be transferred from its inhibiting position into its release position, at any rate when the coupling lever and second inhibiting pawl are coupled. The coupling lever can achieve contact with the second inhibiting pawl via a contact surface, for example in the form of a contact bolt.

In a particularly preferred embodiment, the direct connections between the pivot pin of the coupling lever and the contact surface of the coupling lever and also the connection between the pivot pin of the drive lever and the pivot pin of the second inhibiting pawl form a trapezium, in particular a parallelogram, in a coupled state.

If an actuating lever is provided, the same can apply here: in other words, the direct line of connection between the contact surface on the actuating lever and the pivot pin of the actuating lever and also the direct line of connection between the pivot pin of the drive lever and the pivot pin of the first inhibiting pawl can likewise form a trapezium, preferably a parallelogram.

If an actuating lever is also actually provided in addition to the coupling lever, these can be prestressed in relation to one another, in particular if they are fitted coaxially. The extent of prestressing of the one lever, in particular the coupling lever, can exceed the prestressing of the other lever here, in order thus to make possible a rocker-like effect for coupling the two levers to, and uncoupling them from, one (or both) of the inhibiting pawls.

In a particularly preferred embodiment, the invention makes provision for the coupling lever to interact with a guide surface of the rotary latch. The coupling lever can be, in particular, deflected as a result, for example for the case where it is intended to engage behind the second inhibiting pawl, or to be guided out of engagement therewith. For this purpose, the rotary latch can provide, in particular, a (further) guide mouth and the coupling lever can provide, in particular, a guide surface, for example on a guide bolt or the like.

In quite general terms, however, the concept of the aspect of the invention resides in providing the rotary latch with a guide surface which can act on the chain of effect between the actuating means and one of the inhibiting pawls, in particular the second inhibiting pawl. In other words: the guide surface of the rotary latch can act on the gear mechanism between the actuating means and inhibiting pawl (preferably second inhibiting pawl). This makes it possible for the actuating means to be uncoupled in particular from the inhibiting pawl or to be coupled thereto. Expressed in yet another way: the guide surface of the rotary latch can act on a lever element coupled to the drive lever or on the drive lever itself in order to couple or uncouple the actuating means and inhibiting pawl (preferably the second inhibiting pawl).

According to the invention, a closing pawl for the rotary latch can preferably be arranged on the drive lever. It is possible for this closing pawl to engage, for example, in a closing notch of the rotary latch or to engage behind a nose of the rotary latch in order to transfer the latter, in the manner of a closing aid, from a preliminary-latching position to a fully locked position of the rotary latch. The closing pawl may be assigned, in particular, to the operating arm of the drive lever, said operating arm also having the actuating means arranged on it or forming the actuating means. It is possible here for the closing pawl to be prestressed in the direction of the rotary latch or also to be guided in a guide track on the vehicle body, or the like.

Provision is also preferably made for it to be possible for the drive lever to be coupled to, and uncoupled from, the first and/or the second inhibiting pawl. In this context, it is possible for the gear mechanism which is assigned to the actuating means, and can comprise in particular the drive lever, to be capable of being coupled to the first inhibiting pawl and also uncoupled again therefrom. The same applies to the second inhibiting pawl. A first activation of the actuating means can typically result in coupling to the first inhibiting pawl. This first inhibiting pawl can then be actuated (or can be actuated in the process). It is then possible (in particular automatically) for the gear mechanism to be uncoupled from the first inhibiting pawl, and for the gear mechanism to be coupled to the second inhibiting pawl. When the actuating means is activated for the second time, the gear mechanism can then ensure transfer of the second inhibiting pawl into its release position, and preferably then also uncoupling from the second inhibiting pawl.

According to a further aspect of the invention, the stated object is achieved by a method according to claim 10. This method is characterized, in particular, in that the first and second inhibiting pawls are moved one after the other from their respective inhibiting position into a release position by the same actuating means, in particular by virtue of the actuating means being activated at two different points in time.

Provision may preferably be made here for the actuating means to be activated for a first time, to ensure transfer of the first inhibiting pawl into its release position. This is followed by a second activation of the actuating means, which ensures transfer of the second inhibiting pawl into its release position.

It should be stated here that not all of what has advantageously been said or observed above is to be repeated in conjunction with the method set forth in claim 10. Repetition is dispensed with for practical reasons and in order to keep the application clear.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

In anticipation of the description of the figures which follows, it should be stated that the same or comparable items are provided, if appropriate, with identical reference signs, in some cases with the addition of lower-case letters or apostrophes. For the sake of simplicity, therefore, the reference signs used in the figures and the description of the figures are used in the patent claims, which follow the description of the figures, if appropriate (in some cases) without apostrophes or lower-case letters, wherever the appropriate articles are comparable.

DETAILED DESCRIPTION

Example embodiments of a locking device will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
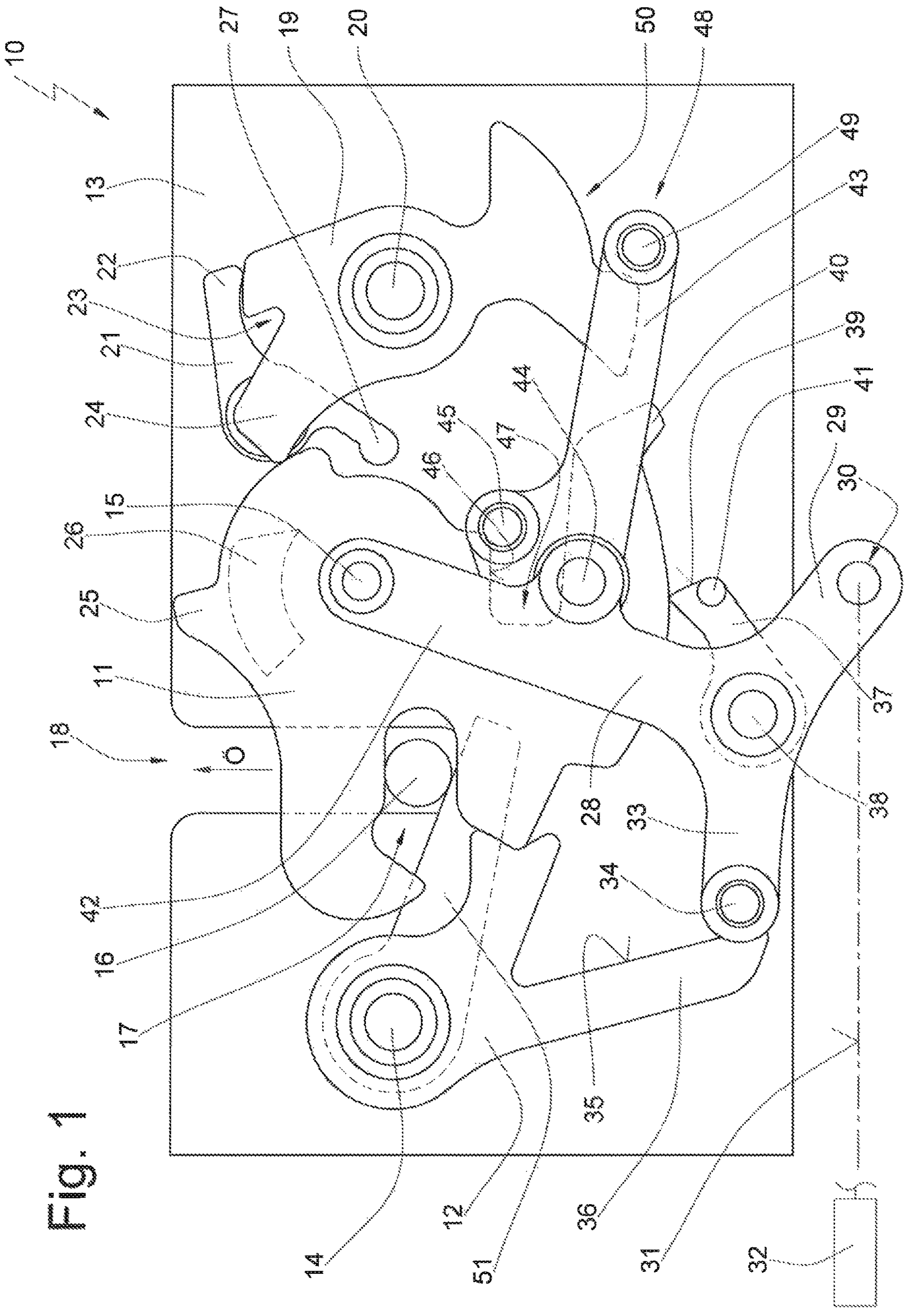
FIG. 1 shows a highly schematic, partially transparent, section-like side view of a first exemplary embodiment of a locking device according to the invention with a rotary latch fully locked and a drive lever located in an initial position.

FIG. 1 shows a first exemplary embodiment of a locking device 10 according to the invention in which a rotary latch 11 is arrested by a first inhibiting pawl 12 in an illustrated locking position. Both the first inhibiting pawl 12 and the rotary latch 11 are arranged on a housing and/or on an installation plate 13 such that they can be pivoted about their respective pivot pins 14, 15.

In the locking position illustrated in FIG. 1, the rotary latch 11 holds captive in its mouth 17 a locking element 16 designed, for example, in the form of a leg of a U-shaped striker. The locking element 16 here enters into a recess 18 of the installation plate 13. It additionally has a lifting lever 51 acting on it, the lifting lever 51 being fitted coaxially with the first inhibiting pawl 12 on the pivot pin 14 and being prestressed in the opening direction Ö, in other words in the counterclockwise direction in FIG. 1. The lifting lever 51 here has two functions. First, it can counteract rattling of the locking element 16 in the mouth 17. Secondly, it assists subsequent movement of the locking element 16 in the outward direction following release of the rotary latch 11.

Whereas the front side of the rotary latch 11 (in other words on the left-hand side in FIG. 1) is assigned the first inhibiting pawl 12, the rear side of the rotary latch 11 (in other words on the right-hand side in FIG. 1) is assigned a second inhibiting pawl 19, which can also be referred to as an inhibiting-pawl safety hook. This second inhibiting pawl 19 is likewise arranged on the installation plate 13 such that it can be pivoted via a pivot pin 20 and is prestressed in the direction of the rotary latch 11, in other words in the anticlockwise direction in FIG. 1.

The second inhibiting pawl 19 is assigned a latch-in lever 21 in a parallel plane, albeit likewise arranged in a pivotable manner on the installation plate 13, and a latching end 22 of said lever can engage, in a manner which will also be described at a later stage in the text, in a latching indent 23 of the second inhibiting pawl 19. In addition to the latching indent 23, the second inhibiting pawl 19 additionally has an inhibiting nose 24, which can interact, in a manner which likewise will also be described at a later stage in the text, with a blocking nose 25 of the rotary latch 11.

In the region of the blocking nose 25 of the rotary latch 11, the rotary latch 11 additionally has formed on it a projecting actuating bead 26 which projects in particular out of the plane of the figure and/or is arranged behind the same and which can interact, in a manner which will also be described at a later stage in the text, with an actuating end 27 of the latch-in lever 21. Furthermore, a drive lever 28 is arranged coaxially with the rotary latch 11, on the common pivot pin 15, on the installation plate 13. The drive lever 28 is illustrated in its initial position in FIG. 1 and can have, in particular, a plurality of arms.

An operating arm 29 here has arranged on it an actuating means 30, which may be provided, for example, by an engaging protuberance and/or part of the operating arm 29. In the present exemplary embodiment, as is illustrated by dashed lines merely in FIG. 1, the actuating means 30 is connected to a drive mechanism 32 (merely indicated) via an operating cable 31, in particular a Bowden cable, or a linkage or the like. The drive mechanism 32 may be, for example, a motor, in particular an electric motor. The drive lever 28 can thus basically be pivoted, around its pin 15, by the drive mechanism 32. The drive lever 28 has a further arm, that is to say the contact arm 33, on which is arranged a contact element, for example a contact bolt 34, in order to establish contact with, and actuate, the first inhibiting pawl 12. In the position illustrated in FIG. 1, the contact bolt 34 here is not yet quite in contact with a contact surface 35 of a release arm 36 of the first inhibiting pawl 12.

A closing pawl 37 is additionally arranged, such that it can be pivoted about a pin 38, in the region of the operating arm 29 of the drive lever 28. The closing pawl 37 basically serves—in a manner which will also be described at a later stage in the text—for a locking operation of the device 10 and for an optional, automatic closing operation of the rotary latch 11. For this purpose, the pawl 37 basically has a closing surface 39, which can then interact, in a manner which likewise will also be precisely described at a later stage in the text, with a closing protrusion 40 of the rotary latch 11. It is possible here for the closing pawl 37 to be prestressed about the pin 38 in the direction of the rotary latch 11 or, as an alternative, to engage by way of a guide bolt 41 (merely indicated) in a guide track or the like on the vehicle body or housing (said guide track not being illustrated in the figures).

Finally, a coupling lever 43 is articulated in the region of the attachment arm 42 of the drive lever 28. The coupling lever 43 is arranged on the drive lever 28 via a pivot pin 44 and is prestressed in relation to the drive lever, with the aid of spring elements (not illustrated), in the direction of the rotary latch 11, and in the direction of the second inhibiting pawl 19 (in other words in the counterclockwise direction in FIG. 1). As a result of this prestressing, a guide bolt 45, which is formed on the coupling lever 43, butts against a guide surface 46 of the rotary latch 11.

The guide surface 46 here may be a constituent part of a second, rear-side mouth 47 of the rotary latch 11. It is also the case that the coupling lever 43 has, at a coupling end 48, a coupling bolt 49, which can basically be assigned to a rear-engagement region 50 of the second inhibiting pawl 19. In the starting position according to FIG. 1, however, the coupling bolt 49 is not yet engaging in the rear-engagement region 50 of the second inhibiting pawl 19. Therefore, in this sense, the coupling lever 43 is not yet coupled to the second inhibiting pawl 19 (and, therefore, nor is the drive lever 28 or the actuating means 30 either).

So far, so good in respect of the basic construction of the locking device 10 according to FIG. 1 of the invention. In order, then, to initiate an opening operation from the inhibiting position of the locking device 10 according to FIG. 1, the drive mechanism 32 can be actuated. This results, via the linkage or the operating cable 31, in an activation of the actuating means 30 and subjects the operating arm 29 of the drive lever 28, for example, to a tensile force, to the left (in the direction of the drive 32) in FIG. 1. The drive mechanism 32 can be actuated here, for example with the aid of a button, switch or the like, by a driver sitting in the cockpit of the vehicle.

Figure 2:
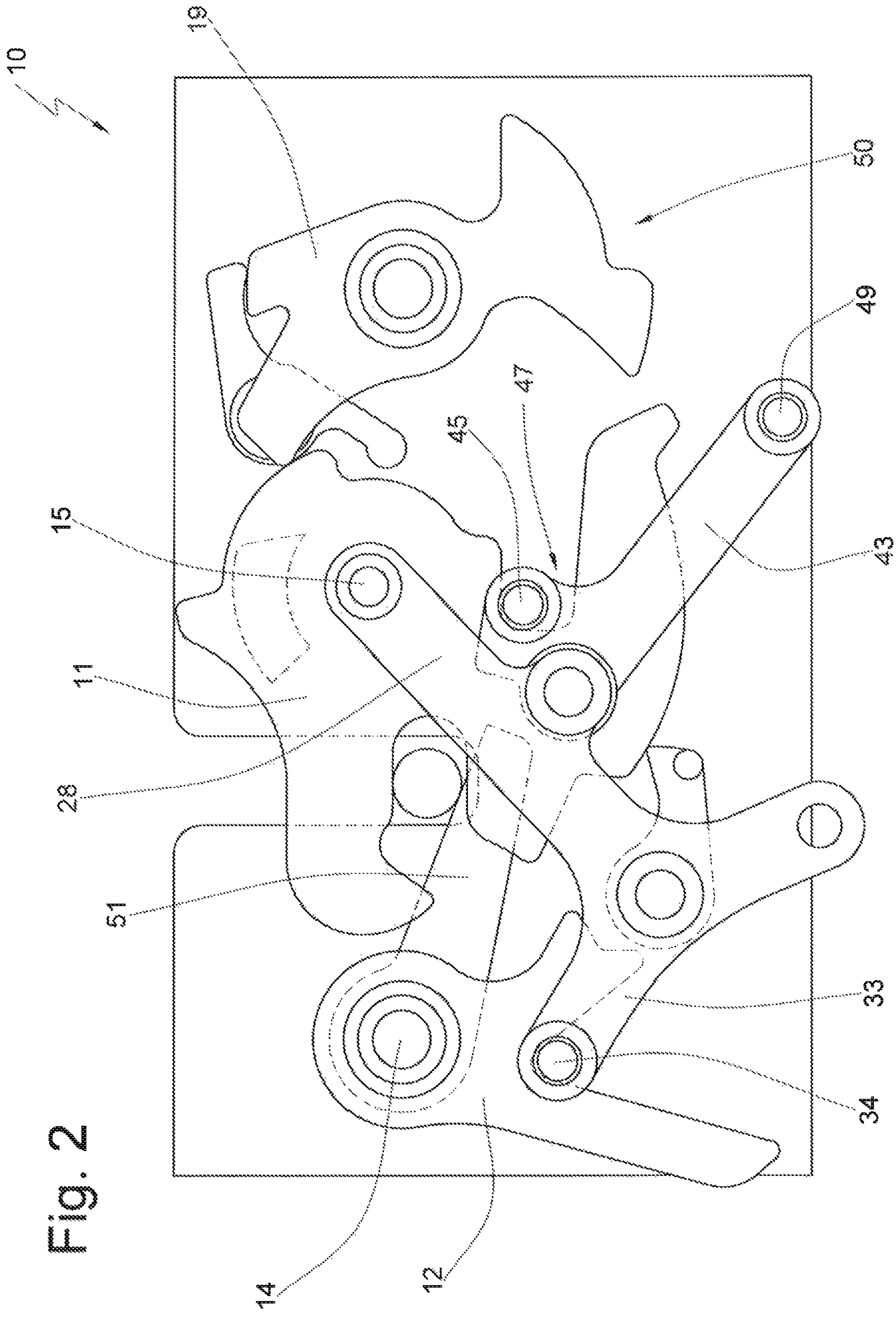
FIG. 2 shows the locking device according to FIG. 1 with the drive omitted and with the drive lever pivoted and a first inhibiting pawl located in a release position.

On account of this activation of the actuating means 30, the drive lever 28 can then be pivoted, that is to say around the pivot pin 15 (in other words in the clockwise direction in FIG. 2), from a position according to FIG. 1 (so-called initial position) into the position illustrated in FIG. 2. The contact bolt 34 of the contact arm 33 of the drive lever 28 here finally comes into contact with the contact surface 35 of the release arm 36 of the first inhibiting pawl 12, and can thus transfer the inhibiting pawl 12, around its pivot pin 14, (counter to the prestressing force of the first inhibiting pawl 12) from the inhibiting position illustrated in FIG. 1 into the release position illustrated in FIG. 2.

Figure 4:
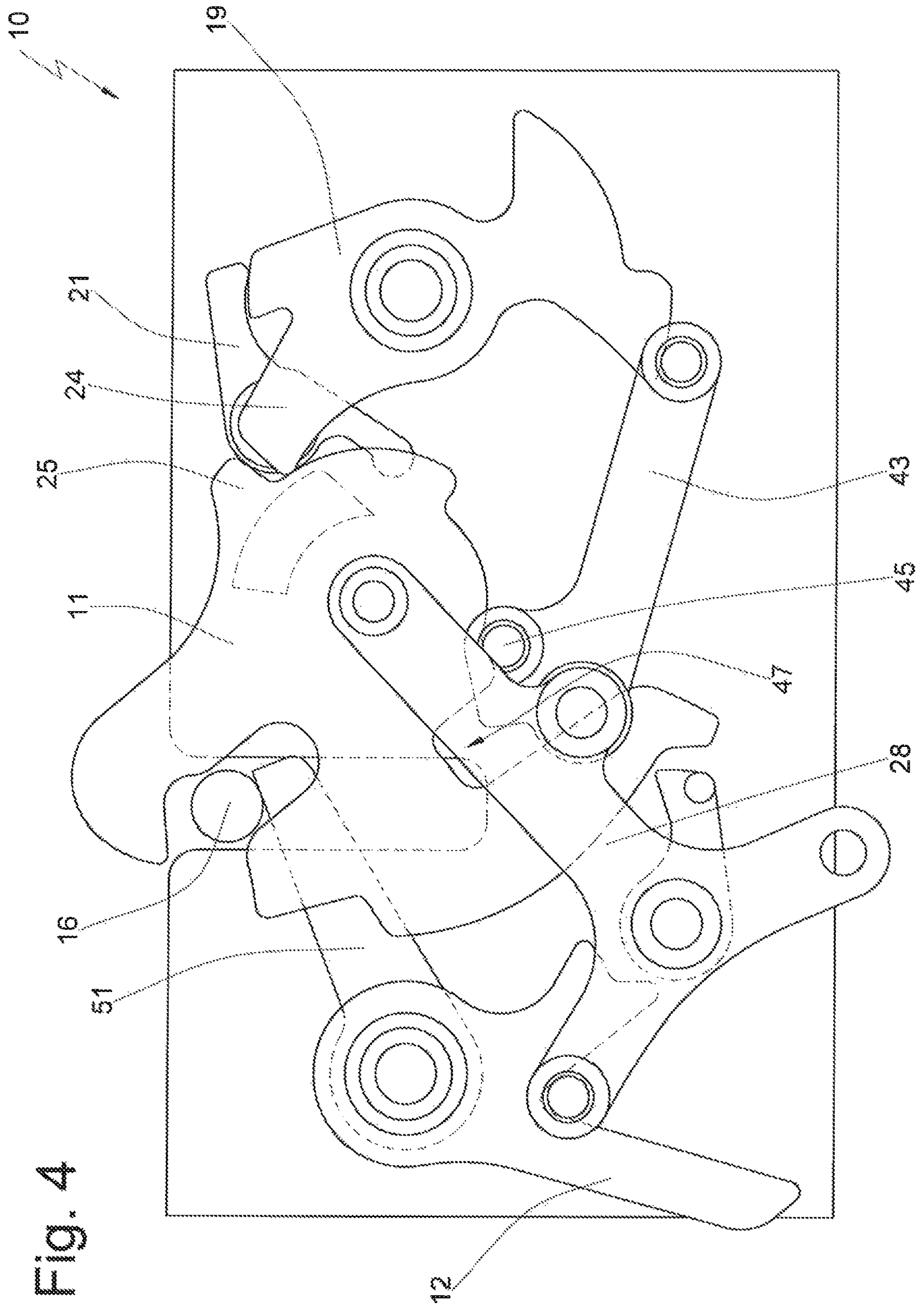
FIG. 4 shows the locking device according to FIG. 3 with a rotary latch located in a safety-catch position.

According to FIG. 2, the rotary latch 11 has now been released (by the first inhibiting pawl 12) and, starting from the position according to FIG. 2, can pivot in the opening direction Ö in the clockwise direction around its pivot pin 15, with possible assistance from the lifting lever 51, until it reaches its safety-catch position according to FIG. 4.

Prior to this happening, however, let us refer back once again to FIG. 2, from which it is evident in particular in comparison with FIG. 1 that the coupling lever 43 has been pivoted along with the drive lever 28 and the coupling bolt 49 has thus clearly passed out of the rear-engagement region 50 of the second inhibiting pawl 19. The coupling lever 43 owes the position illustrated in FIG. 2 here to its guide bolt 45, which has now penetrated into the rear mouth 47 of the rotary latch 11, and has been guided in particular along the upper edge thereof which forms the guide surface 46.

According to FIG. 2, the coupling lever 43 is clearly in a state in which it is uncoupled from the second inhibiting pawl 19. The contact arm 33, in contrast, is clearly coupled to the first inhibiting pawl 12. As described, the rotary latch 11 can then pivot into its safety-catch position illustrated in FIG. 4, wherein it also passes through in particular a position according to FIG. 3, from which it is evident that the guide bolt 45 of the coupling lever 43 passes out of the mouth 47 again as a result of the opening movement of the rotary latch 11.

Figure 3:
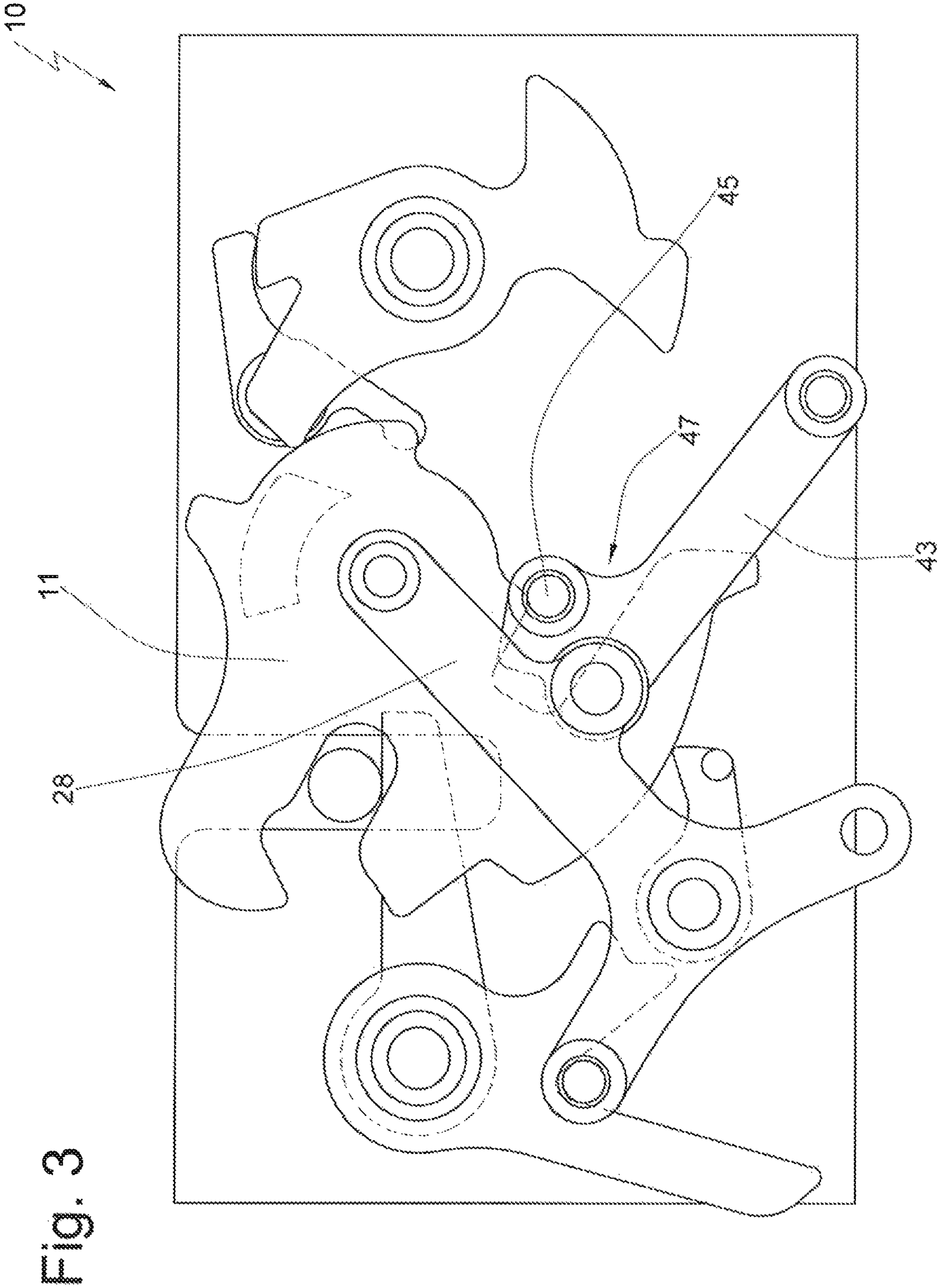
FIG. 3 shows the locking device according to FIG. 2 with the rotary latch pivoted to a slight extent.

It should be noted here that the coupling lever 43 in FIGS. 1 to 3 is in an identical position—possibly by chance—relative to the drive lever 28. This relative position changes, however, as movement progresses, as indicated in FIG. 4, which then—as already described—shows the safety-catch position of the rotary latch 11. This is because, in this safety-catch position, the rotary latch 11 is blocked by the second inhibiting pawl 19 with the aid of the inhibiting nose 24. For this purpose, the inhibiting nose 24 is located in the pivoting path of the rotary latch 11, without actually, in the present exemplary embodiment, establishing contact therewith. In particular, in the present exemplary embodiment, there is no contact established at any rate between the inhibiting nose 24 and blocking nose 25 of the rotary latch 11. FIG. 4 shows a safety-catch position of the rotary latch, which is actually defined rather by the lifting lever 51. This is because the latter, according to FIG. 4, strikes against a stop 99 (indicated), which is mounted on the vehicle body and provides a maximum limit as the lifting lever 51 pivots in the opening direction into the position illustrated in FIG. 4. It is therefore also the case that the lifting lever does not raise the locking element 16 any further, and the prestressing force of the rotary latch 11 itself is insufficient to pivot any further in the opening direction counter to the weight of the bonnet and/or of the locking element 16. It is therefore possible here in particular for a gap 98 to remain between the blocking nose 25 and inhibiting nose 24. This gap has tolerance-related reasons, and subsequent locking of the device is thereby facilitated. This will not be discussed in any more detail here, though. It is therefore nevertheless the case that the second inhibiting pawl 19 secures or blocks the rotary latch in the safety-catch position illustrated in FIG. 4, thus inhibiting it in the opening direction. In the context of the present application, this can also be referred to as an arresting action.

In a position according to FIG. 4, it is also the case that the coupling lever 43 has re-engaged, in the counterclockwise direction in FIG. 4, and can be supported at the lower end of the pawl 19. The guide bolt 45 here has passed out of the mouth 47, but is still supported on the rotary latch 11. According to FIG. 4, the locking element 16, which has the lifting lever 51 acting on it, has already moved some way in the opening direction (that is to say upwards), or into its raised position, in the recess 18. This safety-catch position prevents, in particular, the situation where the hinged opening panel of the vehicle, on which the locking element 16 is arranged, springs into the driver's line of vision, in particular as a result of automatic air suction or the like.

Figure 5:
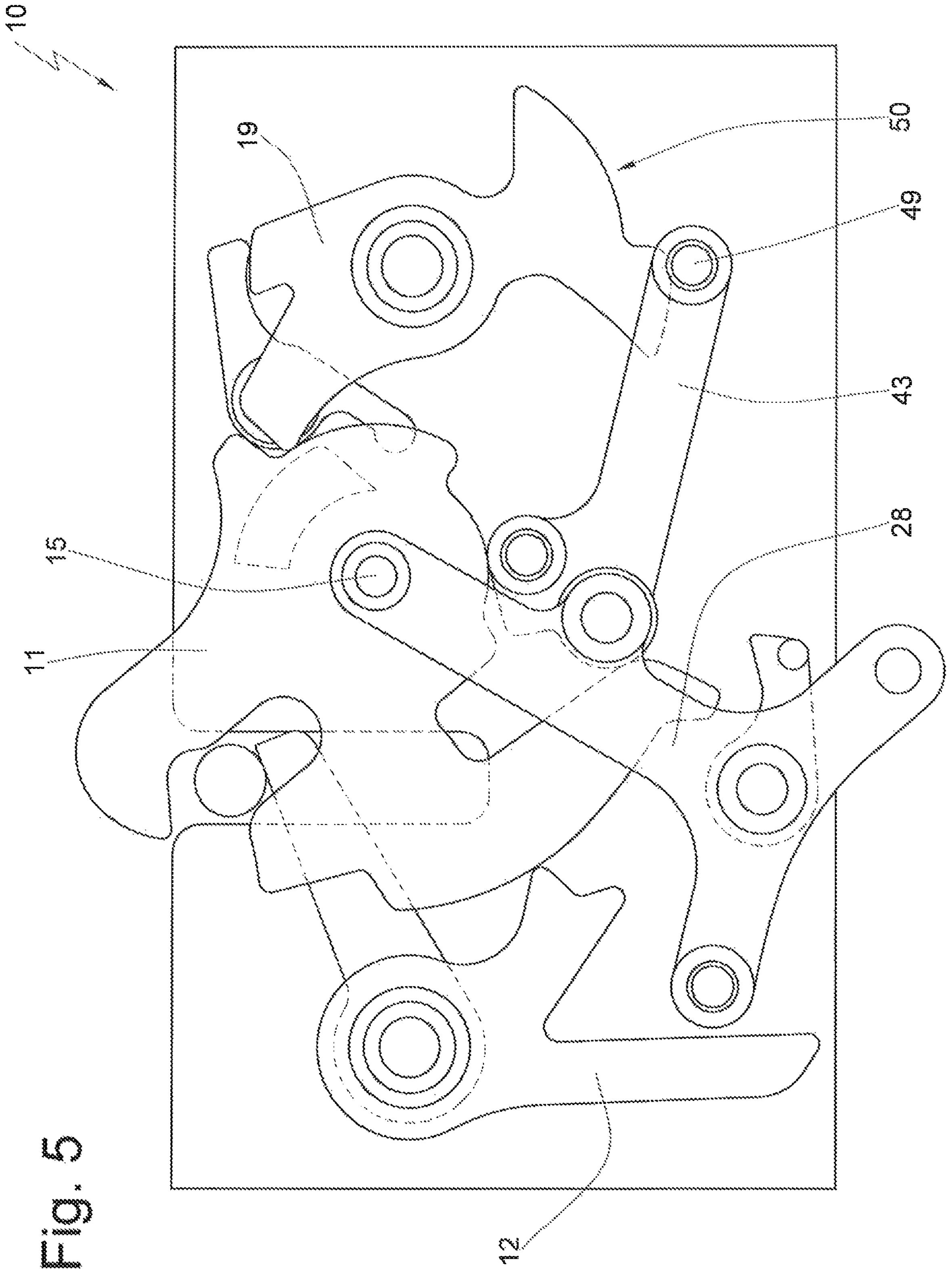
FIG. 5 shows the locking device according to FIG. 4 with the drive lever partially pivoted back.
Figure 6:
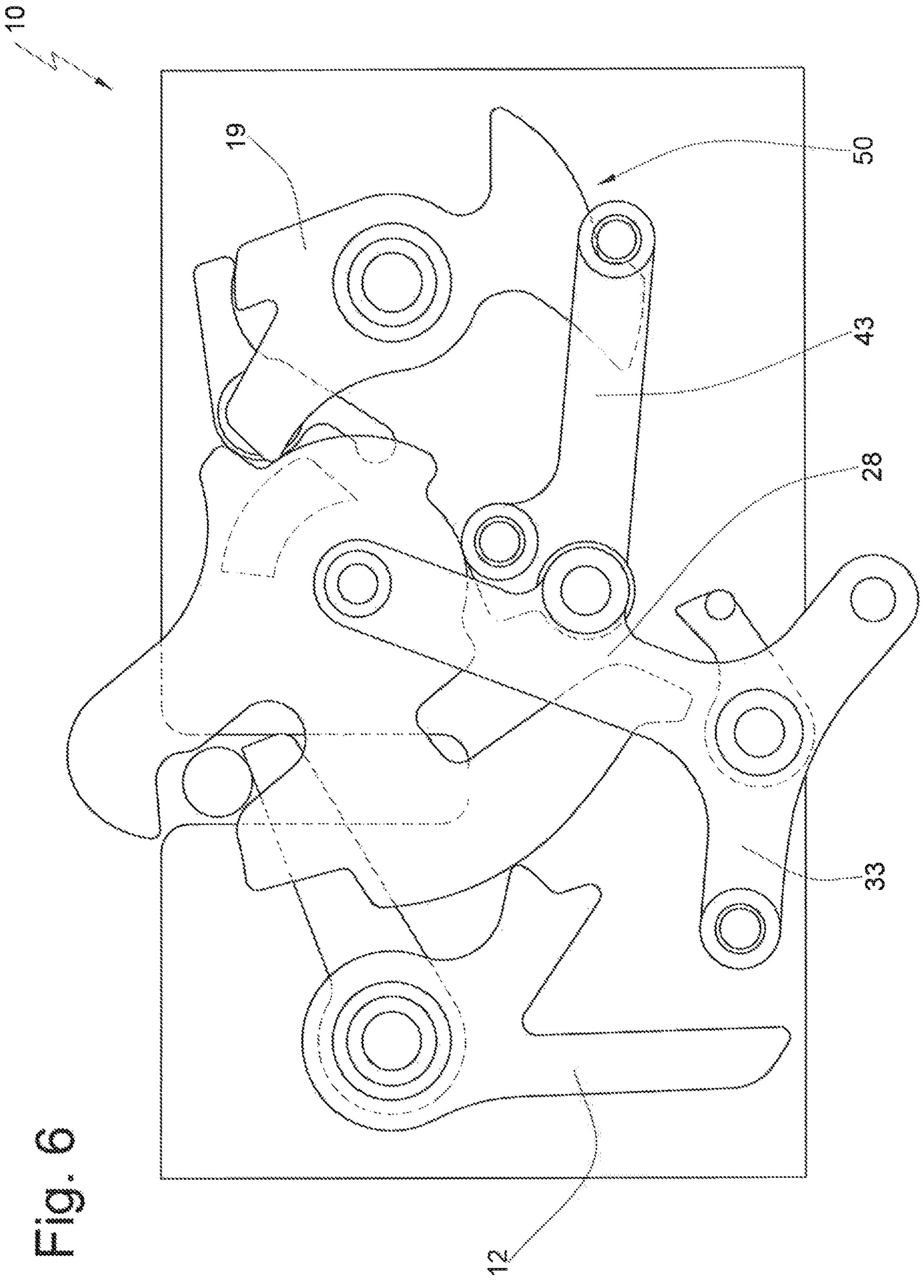
FIG. 6 shows the locking device according to FIG. 5 with engagement behind a second inhibiting pawl.

If, then, starting from a position according to FIG. 4, the drive lever 28 is relieved of loading, it pivots around its pivot pin 15 again in the direction of its initial position, in other words in the counterclockwise direction in FIG. 5. The first inhibiting pawl 12 is released as a result, and said inhibiting pawl can engage, in its prestressing direction, in relation to the rotary latch 11 and position itself against the latter. The coupling bolt 49 of the coupling lever 43, as it were, passes, via the position illustrated in FIG. 5, into engagement with the second inhibiting pawl 19, which position is illustrated in FIG. 6 and in which the coupling bolt is fully incorporated in the rear-engagement region 50 of the second inhibiting pawl 19. In this position, the coupling lever 43 has been coupled to the second inhibiting pawl 19 and the contact arm 33 has been uncoupled again from the first inhibiting pawl 12. According to FIG. 6, the drive lever 28 assumes its initial position.

Figure 7:
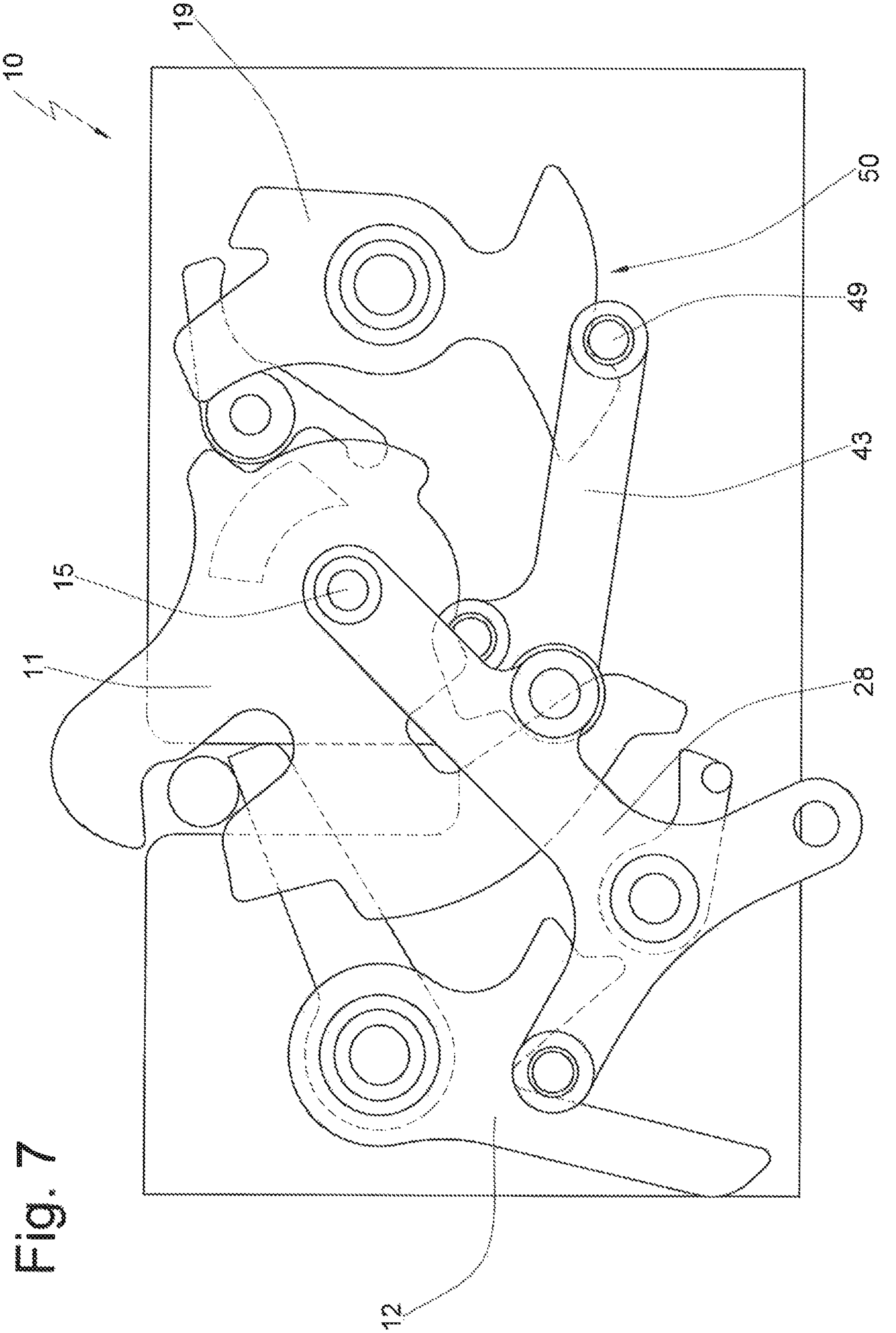
FIG. 7 shows the locking device according to FIG. 6 with the second inhibiting pawl transferred into a release position.

If, then, starting from a position of the device 10 according to FIG. 6, the drive mechanism 32, which is illustrated schematically merely in FIG. 1, is activated for a second time, the drive lever 28 pivots anew about its pivot pin 15 into the position illustrated in FIG. 7. In the present exemplary embodiment, it can also deflect the first inhibiting pawl 12 here, although this is not imperative and takes place merely for geometry-related reasons. The more critical factor is that, during the illustrated pivoting action—in other words in the clockwise direction in the figures—from its initial position according to FIG. 6 into the position according to FIG. 7, the drive lever 28 carries along the coupling lever 43 and, in the process, transfers the second inhibiting pawl 19 (by virtue of the coupling lever 43 and inhibiting pawl 19 being coupled via the coupling bolt 49 and the rear-engagement region 50) into the release position. In this position, the second inhibiting pawl 19 can release the rotary latch 11.

So that the second inhibiting pawl 19 remains long enough in its release position according to FIG. 7, and so that the second inhibiting pawl 19 does not re-engage in the event of being subjected to the weight of snow, it is then possible for the latch-in lever 21 to move about its pivot pin, in the clockwise direction in the figures, from the position illustrated in FIG. 7 and to engage in the latching indent 23 of the inhibiting pawl 19. The latch-in lever 21 and the second inhibiting pawl 19 are actually arranged in different planes. However, the latch-in lever 21 has the latching end 22, which can project, or similar, for example into the plane of the second inhibiting pawl 19. The second inhibiting pawl 19 is therefore kept open in FIG. 8, and the drive lever 28 has been pivoted back into its initial position.

Figure 8:
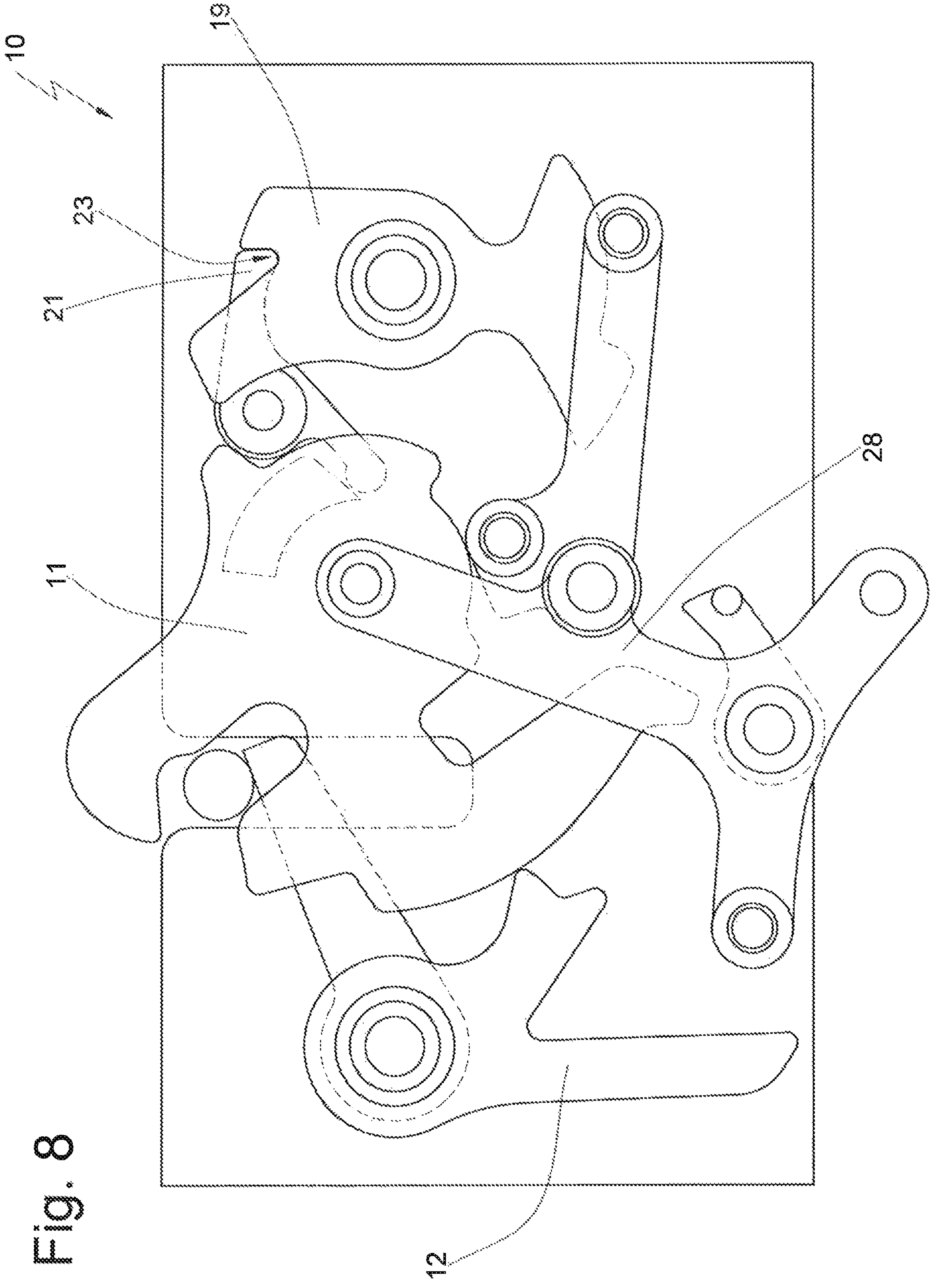
FIG. 8 shows the locking device according to FIG. 7 with a latch-in lever engaged.
Figure 9:
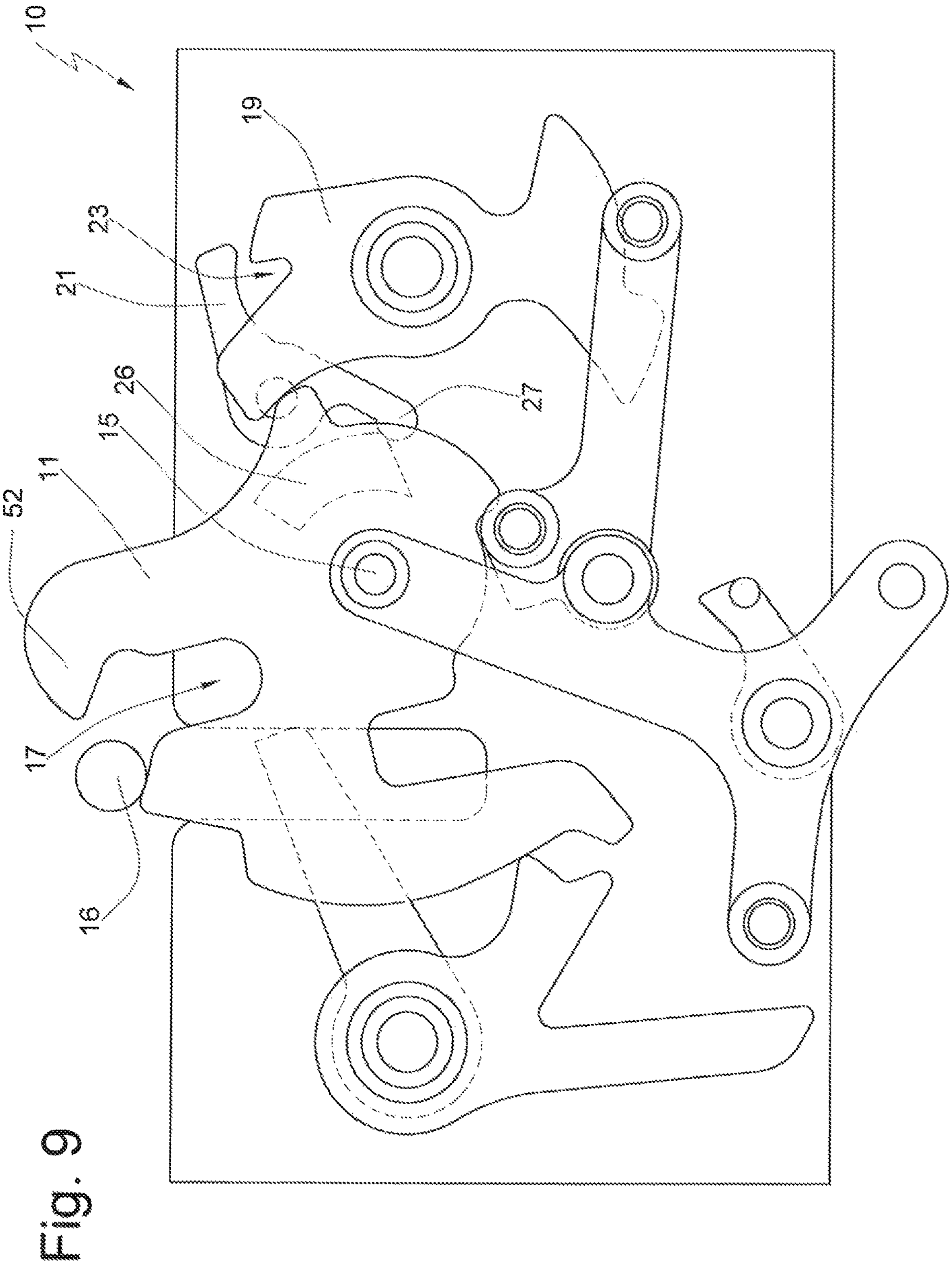
FIG. 9 shows the locking device according to FIG. 8 with the latch-in lever deflected by the rotary latch and the rotary latch located in the fully open position.

Starting from a position according to FIG. 8 (or FIG. 7), release via the second inhibiting pawl 19 located in the release position can thus then cause the rotary latch 11 to pivot onwards, around its pivot pin 15, into the fully open position according to FIG. 9. In particular, it is possible here for the locking element 16 to pass out of the mouth 17 of the rotary latch 11, if appropriate past the safety-catch-like portion 52 of the rotary latch 11. A vehicle driver can then simply prop up or raise up, or similar, the hinged opening panel connected to the locking element 16. It is clear that, going between FIGS. 8 and 9, the latch-in lever 21 is raised out of the latching indent 23 of the second inhibiting pawl 19 by the rotary latch 11 (in other words it is pivoted in the anticlockwise direction in FIG. 9). This takes place by virtue of the actuating bead 26 of the rotary latch 11 establishing contact with the actuating end 27 of the latch-in lever 21. Both elements 26, 27 here are arranged essentially behind the plane of the figure. The second inhibiting pawl 19 is therefore released as a result and can engage, in the anticlockwise direction in the figures, in its position illustrated in FIG. 9.

Figure 10:
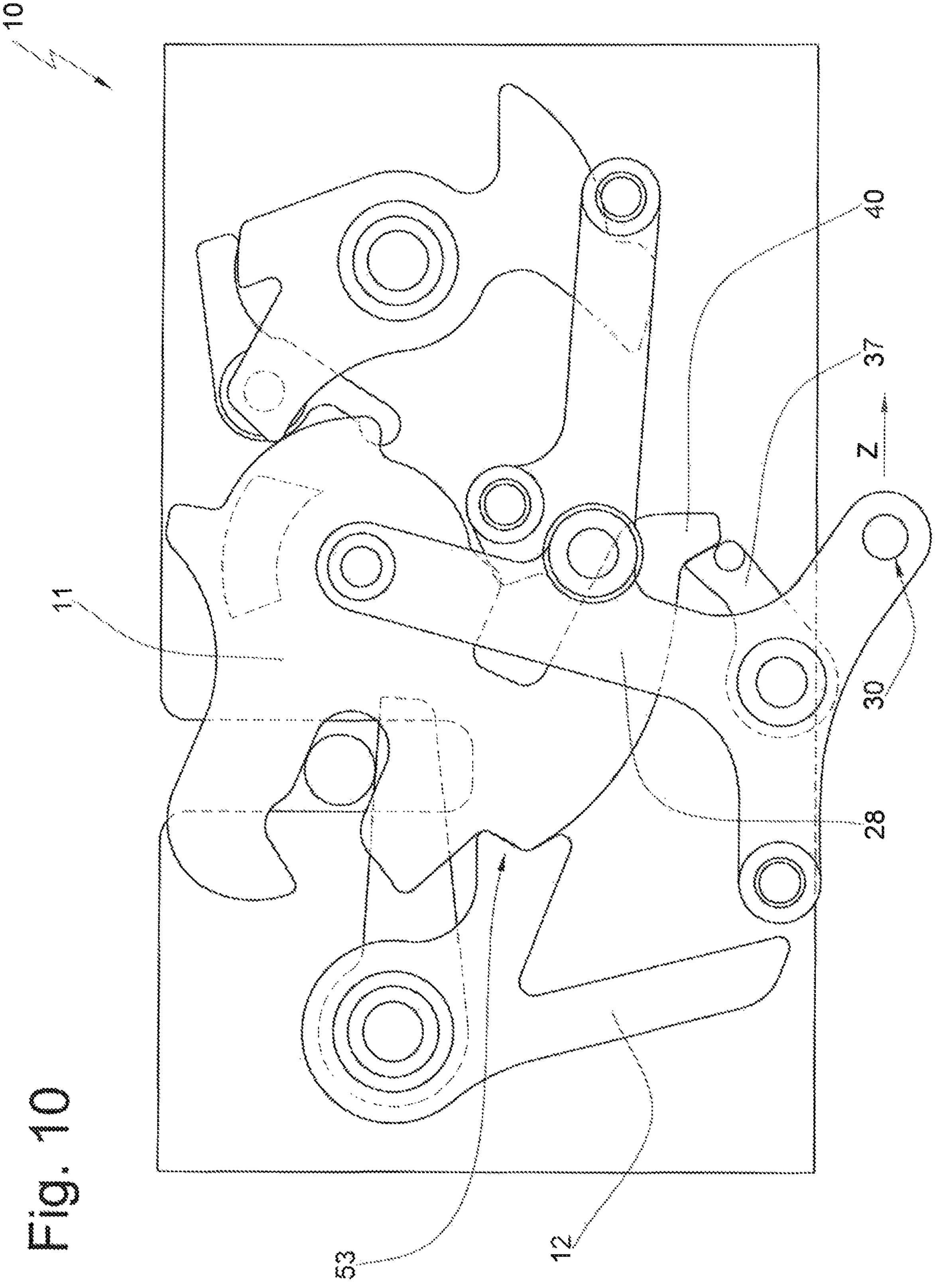
FIG. 10 shows the locking device according to FIG. 9 during a locking operation, in a preliminary-latching position.

Once the vehicle driver has had access to the region beneath the bonnet, he can then initiate a locking movement by closing the bonnet (not illustrated). This typically results in the locking element 16 penetrating into the mouth 17 of the rotary latch 11, wherein the penetrating locking element 16 acts on the rotary latch 11 and "drives" it (in other words in the counterclockwise direction, counter to the opening direction Ö, in the figures) or pivots it back. This transfer back, counter to the force of the lifting lever 51, at any rate takes place until the position of the device 10 according to FIG. 10 is reached, in which the first inhibiting pawl 12 has engaged in a preliminary latching indent 53 of the rotary latch 11. In the position according to FIG. 10, the closing pawl 37, which is arranged on the drive lever 28 has engaged in a closing position, in which it engages behind the closing protrusion 40 of the rotary latch 11.

Starting from the position shown in FIG. 10, there are then two options for the continued locking operation. In the first instance, for the case where it is closed under considerable force, the bonnet can simply pivot automatically (and without any further action on the part of the closing pawl 37) into the main-latching position, or locking position, illustrated in FIG. 1. However, if the force is not sufficient for this purpose, and if the bonnet is placed onto the vehicle, merely with a small amount of pressure being applied, counter to the force of the lifting lever, this can be automatically detected by the vehicle or the device 10. In this case, the drive mechanism 32, for example via the linkage 31, can subject the actuating means 30 to such a force that the drive lever 28 then pivots in a second direction Z, that is to say in the counterclockwise direction in the figures, from the initial position illustrated in FIG. 10. Of course, the drive lever 28 here carries along the closing pawl 37, and the latter transfers the rotary latch 11 into the locking position illustrated in FIG. 10. It is then possible for the drive lever 28, together with the closing pawl 37, to pivot back, counter to the direction Z, into the initial position according to FIG. 10, and FIG. 1.

As an alternative, for the case where the drive mechanism 32 is attached to the actuating means 30 merely via an operating-cable element, it is also possible to provide a further drive, which enables said closing mechanism by activating the actuating means in the second direction or closing direction Z. The device 10 has then once again reached its starting position according to FIG. 1.

Figure 11:
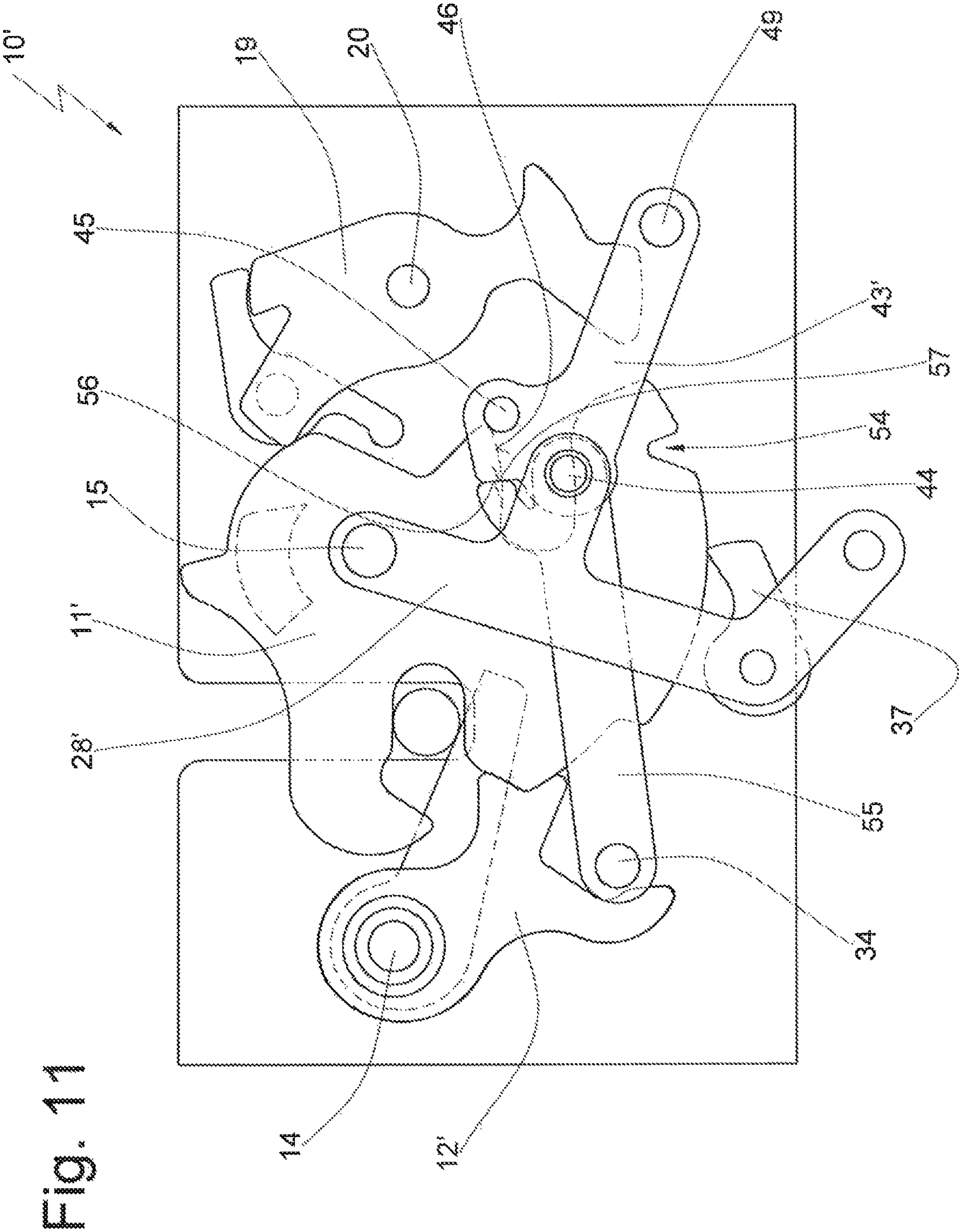
FIG. 11 shows a second exemplary embodiment of the locking device according to the invention, more or less in a view according to FIG. 1 and with the drive omitted.

FIG. 11 shows a further, alternative exemplary embodiment of the locking device 10' according to the invention, in the case of which the movement sequence is essentially identical to the sequence above. In respect of FIG. 11, reference should therefore be made essentially to the explanations given above. FIG. 11 should be used to explain merely the obvious differences (other than irrelevant differences relating to the geometry, for example of the first inhibiting pawl 12'). Thus, there is a small difference in the fact that, for closing purposes, the closing pawl 37 of the locking device 10', rather than cooperating with a closure protrusion of the rotary latch 11, can engage in a closing notch or closing bead 54 of the rotary latch 11'. Otherwise, the closing operation proceeds in a very much identical manner to the first exemplary embodiment.

The main difference between the two exemplary embodiments, in contrast, is that, rather than having a contact arm 33, the drive lever 28' according to FIG. 11 has a second, long coupling lever, also referred to as actuating lever 55. This actuating lever 55 is fastened on the drive lever 28' coaxially with the coupling lever 43', via the same pivot pin 44. In this context, the coupling lever 43' and the actuating lever 55' are prestressed in relation to one another and, for this purpose, each have respective prestressing surfaces 56, 57. In other words, the coupling lever 43' is prestressed in the anticlockwise direction, and the actuating lever 55' is prestressed in the clockwise direction, in FIG. 11.

Accordingly, the two levers form a rocker since, although they are in contact via their prestressing surfaces 56, 57 most of the time, they can also be pivoted away from one another. For example, the coupling lever 43' can be pivoted relative to the actuating lever 55' if the bolt 45 comes into contact with the guide surface 46 of the rotary latch 11', wherein the coupling lever 43' can be deflected in order to pass into, or out of, the rear-engagement region of the second inhibiting pawl 19.

Provision is typically made for the prestressing of the coupling lever 43' to slightly exceed the prestressing of the drive lever 55' in terms of force, and therefore, in the coupled state, the two levers 43' and 55' are easily prestressed jointly in the prestressing direction of the coupling lever 43' (in other words in the anticlockwise direction in FIG. 11). This results, in particular, in it being possible for the bolt 45 to be pushed against the guide surface 46.

As far as FIG. 11 is concerned, it should be noted, in conclusion, that the second exemplary embodiment also has a further special feature, that is, the gear mechanism illustrated forms two parallelograms. A first parallelogram is made up of the connection between the pivot pins 14 and 15 and also the contact bolt 34 and the pin 44. These two sides mentioned of the parallelogram are, in particular, of the same length. The same also applies, at any rate in the coupled state according to FIG. 11, to the imaginary connection between the pin 14 and bolt 34 and also between the pin 15 and pin 44. The second parallelogram is formed between the pin 15 and the pivot pin 20 of the second inhibiting pawl 19 and also, on the other hand, by the pin 44 and the bolt 49. In the coupled state (not illustrated), it is then also the case that the connections between the pin 15 and the pin 44 and also between the pin 20 and the bolt 49 are each of equal length.

Merely for the sake of completeness, it is pointed out once again that the claims give the reference signs mainly without apostrophes since they refer essentially to comparable items. There are some exceptions to this in the claims. However, in most cases, and unless separately indicated, the reference signs should cover both exemplary embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A locking device for a vehicle door, bonnet, or hood, the locking device, comprising:
- a first inhibiting pawl biased toward a first inhibiting position;
- a rotary latch which can be arrested in a locking position by the first inhibiting pawl being located in the first inhibiting position;
- a second inhibiting pawl biased toward a second inhibiting position to arrest the rotary latch in a safety catch position; and
- an actuating linkage configured to be coupled to the first and second inhibiting pawls in a first state of the actuating linkage to cause the first and second inhibiting pawls to move to respective first and second release positions, and the actuation linkage further configured to be uncoupled from the second inhibiting pawl in a second state of the actuating linkage to cause only the first inhibiting pawl to move to the first release position.

2. The locking device of claim 1, wherein the first and second inhibiting pawls are coupled in response to a first actuation of the first inhibiting pawl.

3. The locking device of claim 1, further comprising a common actuating means that actuates the actuating linkage, wherein the rotary latch can be arrested or inhibited in its safety catch position by the second inhibiting pawl being located in the second inhibiting position, and wherein the first and second inhibiting pawls can be transferred from their respective first and second inhibiting position into their respective first and second release positions by the common actuating means.

4. The locking device of claim 1, further comprising a coupling lever configured to be coupled to the second inhibiting pawl and to be uncoupled from the second inhibiting pawl.

5. The locking device of claim 4, wherein the rotary latch comprises a guide surface configured to deflect the coupling lever to couple or decoupled the first and second inhibiting pawls.

6. The locking device of claim 5, wherein the coupling lever is prestressed towards the rotary latch.

7. The locking device of claim 6, wherein the first inhibiting pawl and the second inhibiting pawl are on radially opposite sides of the rotary latch.

8. A locking device for a vehicle door, bonnet, or hood, the locking device, comprising:
- a first inhibiting pawl biased into a first inhibiting position;
- a rotary latch which can be arrested in a locking position by the first inhibiting pawl being located in the first inhibiting position;

a second inhibiting pawl biased into a second inhibiting position to arrest the rotary latch in a safety catch position; and an actuating linkage configured to be coupled to the first and second inhibiting pawls when located in a coupled position to cause the first and second inhibiting pawls to move to respective first and second release positions, and the actuation linkage further configured to be uncoupled from the second inhibiting pawl when located in an uncoupled position to cause only the first inhibiting pawl to move to its release position;

wherein the actuating linkage is moved from its uncoupled position to its coupled position when the rotary latch pivots from its locking position to its safety catch position.

* * * * *